United States Patent [19]

Maebayashi et al.

[11] Patent Number: 4,564,213
[45] Date of Patent: Jan. 14, 1986

[54] STRUT TYPE VEHICLE SUSPENSION MECHANISM

[75] Inventors: Jiro Maebayashi; Shoji Kasai, both of Hiroshima, Japan

[73] Assignee: Mazda Motor Corporation, Hiroshima, Japan

[21] Appl. No.: 704,151

[22] Filed: Feb. 22, 1985

Related U.S. Application Data

[63] Continuation of Ser. No. 438,654, Nov. 2, 1982, abandoned.

[30] Foreign Application Priority Data

Nov. 5, 1981 [JP] Japan .................................. 56-178217

[51] Int. Cl.⁴ ............................................. B60G 3/00
[52] U.S. Cl. ..................................... 280/690; 280/701
[58] Field of Search ................................. 280/690, 701

[56] References Cited

U.S. PATENT DOCUMENTS

| | | | |
|---|---|---|---|
| 3,189,118 | 6/1965 | Arning | 280/701 |
| 4,046,403 | 9/1977 | Yoshida | 280/701 |
| 4,269,432 | 5/1981 | Inoue et al. | 280/690 |

FOREIGN PATENT DOCUMENTS

| | | | |
|---|---|---|---|
| 2450755 | 4/1976 | Fed. Rep. of Germany | 280/690 |
| 2543189 | 4/1977 | Fed. Rep. of Germany | 280/690 |
| 38762 | 11/1979 | Japan . | |

*Primary Examiner*—Joseph F. Peters, Jr.
*Assistant Examiner*—Ross Weaver
*Attorney, Agent, or Firm*—Fleit, Jacobson, Cohn & Price

[57] ABSTRACT

A vehicle suspension mechanism including a carrier for carrying a rear wheel rotatably about an axis of rotation, a strut assembly having an upper end connected with a vehicle body and a lower end connected with the carrier, a swingable arm pivotably connected through resilient rubber bushes with the vehicle body at a longitudinally spaced first forward point and a first rearward point and with the carrier at a longitudinally spaced second forward point and a second rearward point. The aforementioned points are arranged so that the distance between the line connecting the first forward and first rearward points and the line connecting the second forward and second rearward points increases toward the rearward direction, whereby a toe-in movement is produced when the arm is upwardly swung.

2 Claims, 5 Drawing Figures

4,564,213

STRUT TYPE VEHICLE SUSPENSION MECHANISM

This is a continuation of application Ser. No. 438,654, filed Nov. 2, 1982, now abandoned.

The present invention relates to motor vehicle suspension mechanisms and more particularly to strut type vehicle suspension mechanisms.

Strut type suspension mechanisms include swingable link arms having one end pivotably connected with the vehicle body and the other end pivotably connected with a carrier rotatably carrying wheel. Strut assemblies comprised of oleo struts and compression springs are disposed between the vehicle bodies and the carriers so that the strut assemblies from part of the suspension link mechanisms. This type of suspension mechanism is considered advantageous in that points of attachment of the link arms and the strut assembly to the vehicle body are spaced apart by substantial distances so that the impact load from the wheel is transmitted to the vehicle body in a widely distributed manner and therefore the body is not likely to be subjected to a concentrated load. Further, the camber angle and the caster angle of the wheel become less sensitive to manufacturing errors because of the fact that the aforementioned points of attachment are widely spaced apart from each other. It should however be noted that this type of suspension mechanism has not been satisfactory in respect of road gripping characteristics and various moving characteristics under acceleration, deceleration and turning movement of the vehicle. For example, when a vehicle is running through a curved path, it is desirable to produce a toe-in movement in the outward rear wheel in order to prevent or moderate the possible tendency of over-steering. It is further desirable to produce a camber angle change in the outward wheels in order to ensure satisfactory road gripping characteristics. Under deceleration of the vehicle, it is also desirable to produce toe-in movement in wheels to ensure stabilization of steering. Conventional strut type suspension mechanisms, however, have not been satisfactory to produce such desirable movements in the wheels.

In view of these problems, there is proposed by the U.S. Pat. No. 4,046,403, issued on Sept. 6, 1977, to H. Yoshida, a strut type suspension mechanism with which a toe-in movement can be produced in a wheel under a rearwardly directed longitudinal force or an inwardly directed side force. According to the proposal, there is provided a wheel carrier for rotatably carrying a wheel and a swingable arm is pivotably attached to the vehicle body at two longitudinally spaced apart points and to the wheel carrier at two longitudinally spaced apart points. A strut assembly is provided between the wheel carrier and the vehicle body. By properly determining the points of attachment of the swingable arm to the vehicle body and to the wheel carrier, it is possible to produce the afore-mentioned toe-in movement in the wheel. It should however be noted that in the proposed arrangement, it is impossible to produce a toe-in movement under a bumped condition in which the swingable arm is upwardly swung although such toe-in movement is also desirable, particularly in the outward rear wheel, to prevent a tendency of vehicle oversteering during operation through a curved path.

It is therefore an object of the present invention to provide a strut suspension mechanism in which desirable movements can be produced in the wheel under various operating conditions.

Another object of the present invention is to provide a strut type suspension mechanism in which a toe-in movement can be produced in the wheel under a bumped condition.

According to the present invention, the above and other objects can be accomplished by a vehicle suspension mechanism including carrier means for carrying a wheel rotatably about an axis of rotation, strut means having an upper end connected with a vehicle body and a lower end connected with said carrier means, swingable arm means pivotably connected with said vehicle body at a longitudinally spaced first forward point and a first rearward point and with said carrier means at a longitudinally spaced second forward point and a second rearward point, said first forward and rearward points being located with respect to said second forward and rearward points so that a line passing through said first forward and first rearward points is spaced apart from a line passing through said second forward and first rearward points by a distance which increases in a rearward direction. It is preferable to provide at each point of connection of the swingable arm to the body or the carrier a resilient member such as a rubber bush. In the mechanism in accordance with the present invention, a toe-in movement is produced in the wheel when the swingable arm means is upwardly swung with respect to the vehicle body.

The mechanism in accordance with the present invention can advantageously be applied to a rear suspension because, in such a case, when the vehicle is passing through a curved path, the outward rear wheel and the swingable arm associated therewith will be forced upwardly with respect to the vehicle body under a centrifugal force and a desirable toe-in movement will be produced in the outward rear wheel to thereby provide steering stability.

The above and other objects and features of the present invention will become apparent from the following descriptions of preferred embodiments taking reference to the accompanying drawings, in which.

Figure 1:
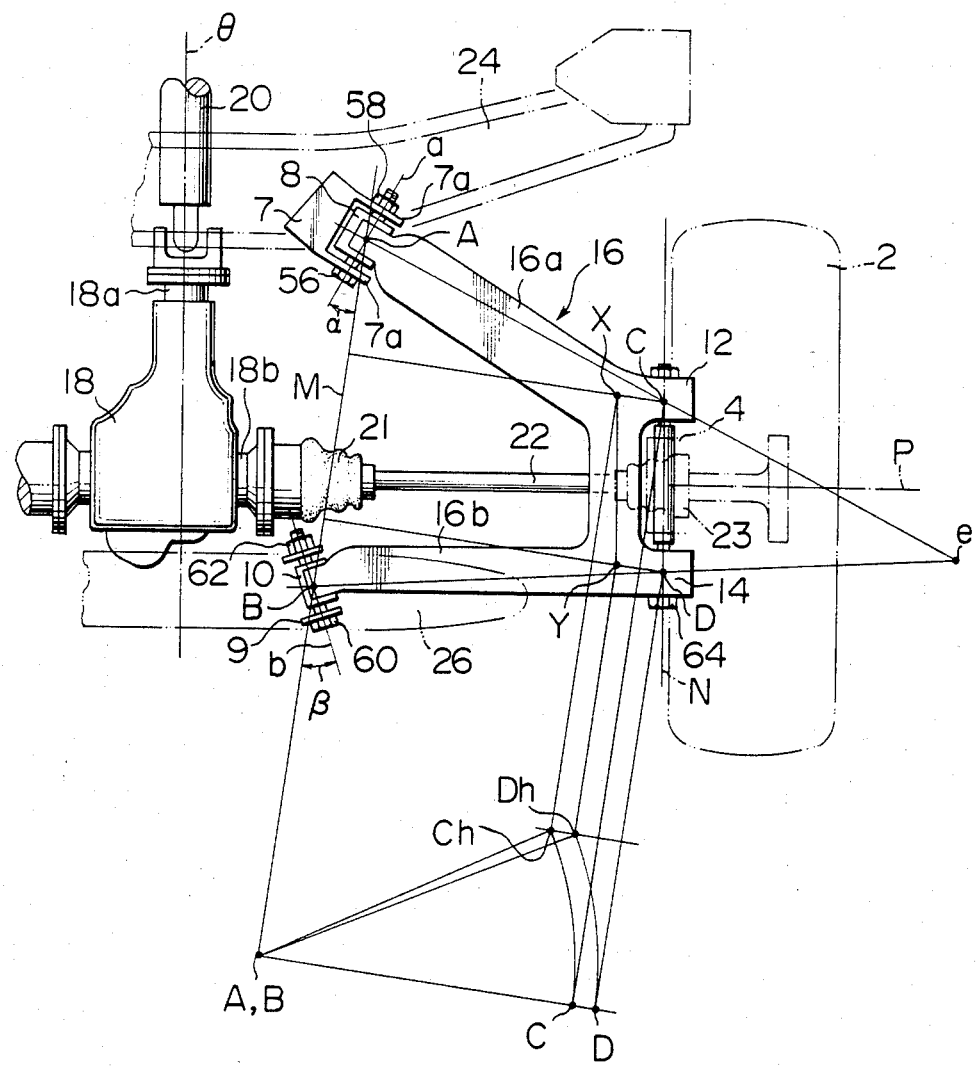
FIG. 1 is a plan view of a rear suspension mechanism in accordance with one embodiment of the present invention.
Figure 2:
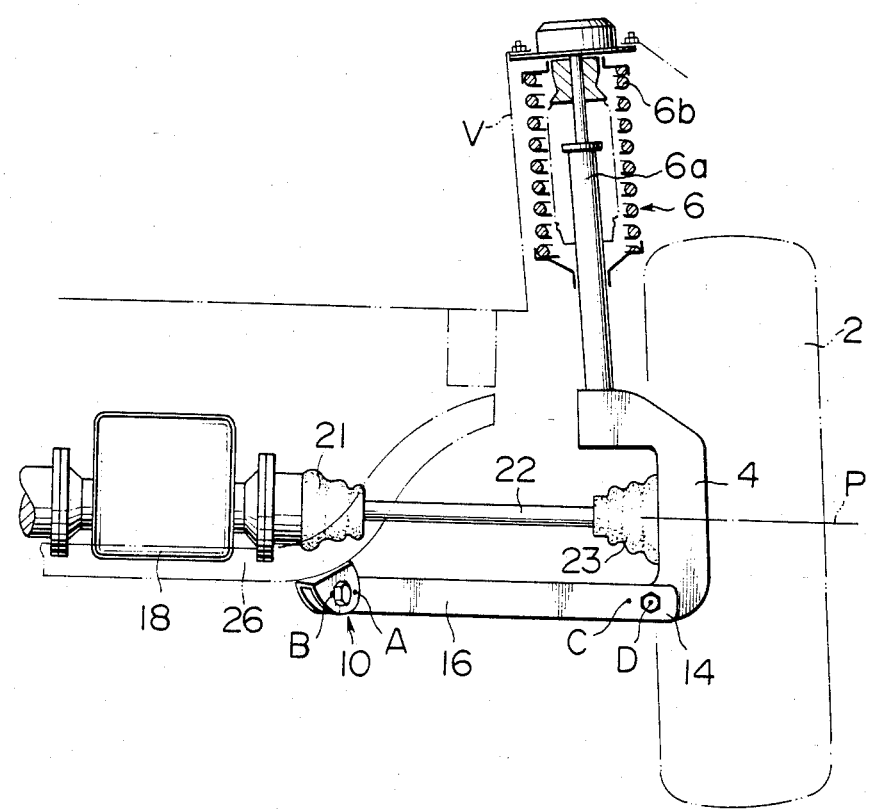
FIG. 2 is a rear view of the suspension mechanism shown in FIG. 1.
Figure 3:
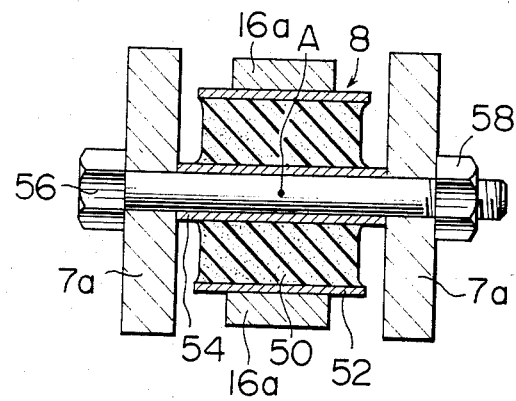
FIG. 3 is a sectional view showing one example of resilient rubber bush.

Referring to the drawings, particularly to FIGS. 1 and 2, there is shown a rear suspension mechanism including a carrier 4 which carries a rear wheel 2 for rotation about its axis P. A strut assembly 6 comprised of an oleo strut 6a and a coil spring 6b is connected at the lower end to the upper portion of the carrier 4. The upper end of the strut assembly 6 is attached to a vehicle body V. A swingable arm 16 is provided and has bifurcated arm levers 16a and 16b which are spaced apart from each other in the longitudinal direction. The forward arm lever 16a is connected through a resilient rubber bush 8 with a bracket 7 provided on a front sub-frame 24 which is attached to the vehicle body through suitable rubber mounts (not shown). As shown in FIG. 3, the rubber bush 8 is constituted by a resilient rubber 50 adhesively attached to an outer tube 52 and an inner tube 54. The outer tube 52 is welded to the free end of the arm lever 16a whereas the inner tube 54 is inserted between a pair of flanges 7a of the bracket 7. A connecting bolt 56 is inserted through the flanges 7a and the inner tube 54 and a nut 58 is engaged with the bolt 56. As shown in FIG. 3, the rubber bush 8 has a center A about which the arm lever 16a is pivotable.

The rear arm lever 16b is connected through a resilient rubber bush 10 with a bracket 9 which is provided on a rear sub-frame 26 attached to the vehicle body V through suitable rubber mounts (not shown). The resilient rubber bush 10 is of the same structure as the bush 8 is and has a center B which corresponds to the center A in the rubber bush 8. As shown in FIG. 1, the rubber bush 8 has a longitudinal axis a which is inclined by an angle α rearwardly and inwardly with respect to a line M passing through the centers a and b of the rubber bushes 8 and 9. The rubber bush 10 is connected to the bracket 9 by means of a bolt 60 and a nut 62 and has a longitudinal axis b inclined b an angle β forwardly and inwardly with respect to the line M.

The swingable arm 16 is provided at the outward end portion with a pair of rubber bushes 12 and 14 which are longitudinally spaced apart from each other as shown in FIG. 1. The rubber bushes 12 and 14 are of the same structures as the bush 8 is and has centers C and D, respectively. The rubber bushes 12 and 14 are axially aligned and a through-bolt 64 is inserted through the bushes 12 and 14 and the carrier 4 for pivotably connecting the arm 16 with the carrier 4. In the illustrated embodiment, the line N passing through the centers C and D of the rubber bushes 12 and 14 is parallel with the longitudinal center line θ of the body V. The arrangement is believed as being advantageous in respect of a stability of the wheel under side force. There is provided a differential gear unit 18 which has an input shaft 18a connected with a propeller shaft 20. The output shaft 18b of the differential gear unit 18 is connected through an axle 22 and universal joints 21 and 23 with the rear wheel 2.

As shown on FIG. 1, the line M passing through the centers A and B of the rubber bushes 8 and 10 is inclined rearwardly and inwardly with respect to the line N passing through the centers C and D of the rubber bushes 12 and 14 so that the distance between the lines M and N is increased the the rearward direction. Further, as shown in FIG. 1, a line passing through the centers A and C intesects a vertical plane containing the centers B and D at a point e which is rearwards of the axis P of the wheel 2. It should therefore be noted in the diagram shown in the lower part of FIG. 1 that, when the swingable arm 16 is upwardly swung to shift the centers C and D of the rubber bushes 12 and 14, the center C is moved substantially along an arc of a circle having a radius smaller than that of a circle along which the center D is moved. Therefore, the center C is moved to the point Ch and the center D to the point Dh. In the plan view of FIG. 1, these points Ch and Ch correspond to points X and Y, respectively, so that a toe-in movement is produced in the wheel 2 as shown by line $\overline{XY}$. Further, since the point e at which the line passing through the centers A and C intersects the plane containing the centers B and D is located as described above, it is possible to produce a toe-in movement in the wheel 2 under a rearwardly directed longitudinal force or an inwardly directed side force.

Figure 4:
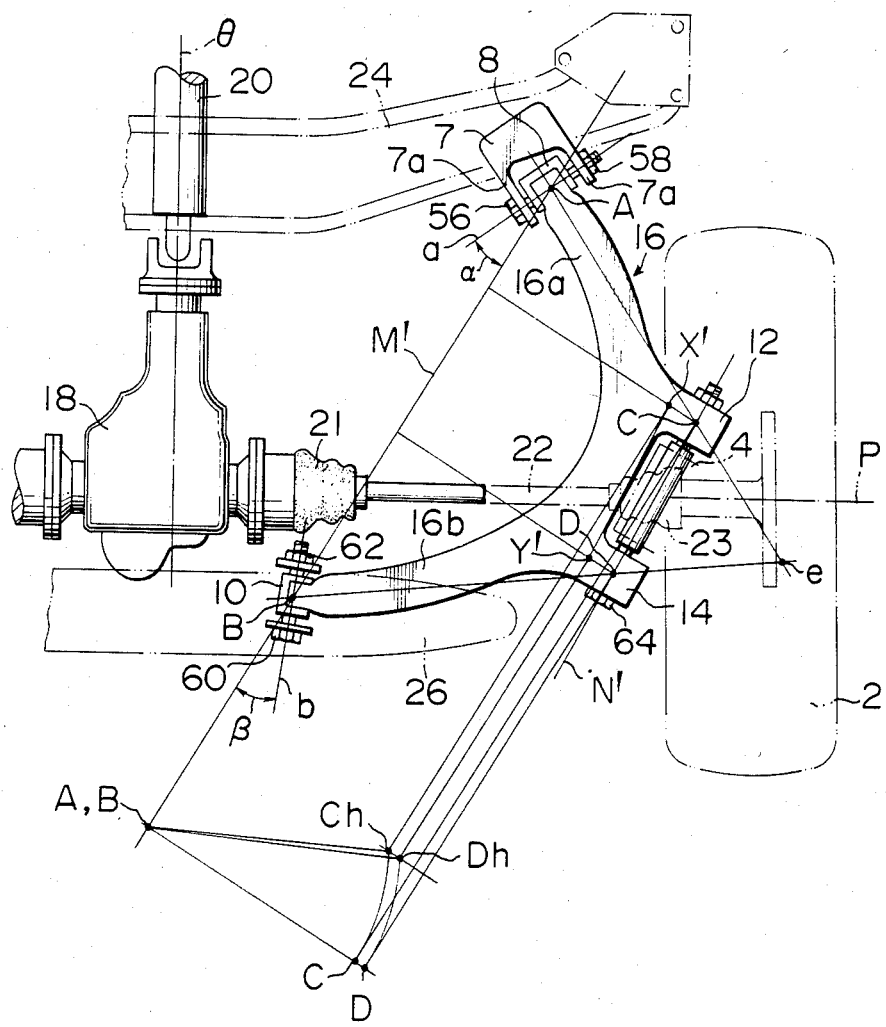
FIG. 4 is a plan view similar to FIG. 1 but showing another embodiment.
Figure 5:
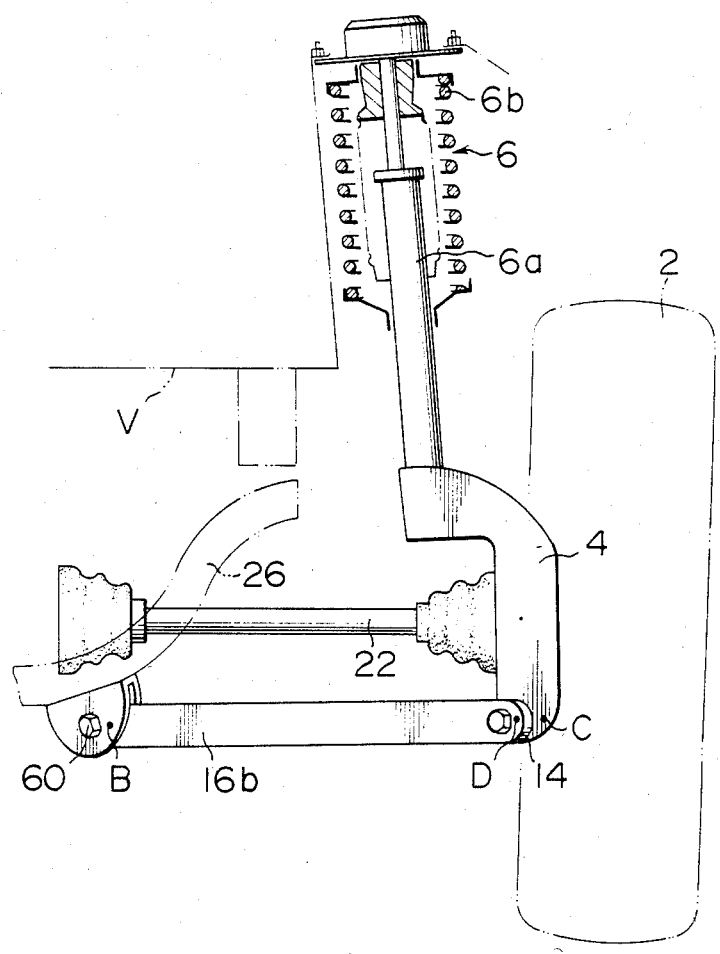
FIG. 5 is a rear view of the mechanism shown in FIG. 4.

Referring now to FIGS. 4 and 5, there is shown another embodiment of the present invention. This embodiment is basically the same as the previous embodiment so that corresponding parts are designated by the same reference numerals as in the previous embodiment. In this embodiment, the line N' passing through the centers C and D of the rubber bushes 12 and 14 is not parallel with the longitudinal center line θ of the body V but is inclined so that the bush 12 is located at a transversely outward position with respect to the rubber bush 14. The line M' passing through the centers A and B of the rubber bushes 8 and 10 is further inclined with respect to the line θ so that the distance between the lines M' and N' is increased rearwards. The bush 8 has an axis a which makes an angle α with the line M'. The axis b of the rubber bush 10 also makes an angle β with the line M'. In other respects, the arrangements are the same as in the previous embodiment so that detailed descriptions will be omitted. In this embodiment, too, a toe-in movement of the wheel 2 will be produced when the arm 16 is swung upwardly and/or when the rear wheel is subjected to a rearwardly directed longitudinal force or an inwardly directed side force.

The invention has thus been shown and described with reference to specific embodiments, however, it should be noted that the invention is in no way limited to the details of the illustrated structures but changes and modifications may be made without departing from the scope of the appended claims.

We claim:

1. A vehicle suspension mechanism including carrier means for carrying a rear wheel rotatably about an axis of rotation, strut means including a shock absorbing strut having an upper end connected with a vehicle body and a lower end connected with said carrier means, swingable arm means including a pair of interconnected lever arms adapted to move as a unit and pivotably connected through resilient means with said vehicle body at a longitudinally spaced first forward pivot point and a first rearward pivot point and with said carrier means at a longitudinally spaced second forward pivot point and a second rearward pivot point, said first forward and rearward pivot points being located with respect to said second forward and rearward pivot points so that a line passing through said first forward and rearward pivot points is spaced apart from a line passing through said second forward and rearward points by a distance which increases in the rearward direction so that pivoting of said swingable arm means toward the vehicle body produces a toe-in movement of the wheel, said first and said second forward pivot points being located with respect to said first and said second rearward pivot points so that a line passing through the first and second forward pivot points intersects a line passing through the first and second rearward pivot points at a point rearwardly of said axis of rotation of the rear wheel and outwardly of a wheel center plane passing through the center of the rear wheel and perpendicular to the axis of rotation of the rear wheel so that toe-in movements are produced in the rear wheel under an inwardly directed side force and a rearwardly directed brake force, said resilient means including a rubber bush provided at each of said first forward and rearward pivot points and comprised of inner and outer tubes connected with a cylindrical rubber element, each of the rubber bushes having a center and a longitudinal axis inclined with respect to a line connecting the centers of the rubber bushes at the first forward and rearward points and inclined relative to the longitudinal center line of the vehicle body in an outward direction toward the front of the vehicle, the angle of inclination of the longitudinal axis of the bush at the first forward pivot point relative to the longitudinal center line of the vehicle body being greater than the angle of inclination of the longitudinal axis of the bush at the first rearward pivot point relative to the longitudinal center line of the vehicle body, said second forward and rearward pivot points being located in a vertical plane which is inclined outwardly toward the front with respect to the longitudinal center line of the vehicle body.

2. A vehicle suspension mechanism in accordance with claim 1 in which, an axle shaft is connected with said rear wheel for transmitting driving torque thereto.

* * * * *